Jan. 30, 1968  H. R. KARLEN ET AL  3,366,034
BREWING APPARATUS
Filed Oct. 21, 1965  2 Sheets-Sheet 1
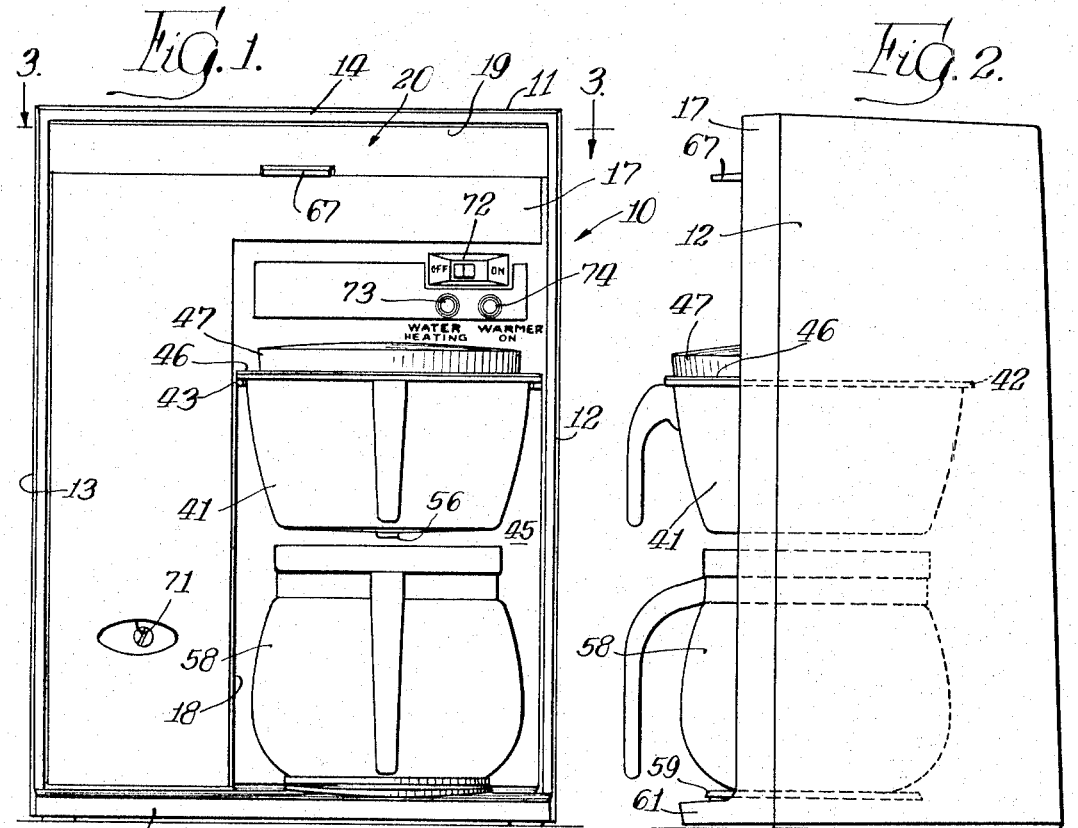
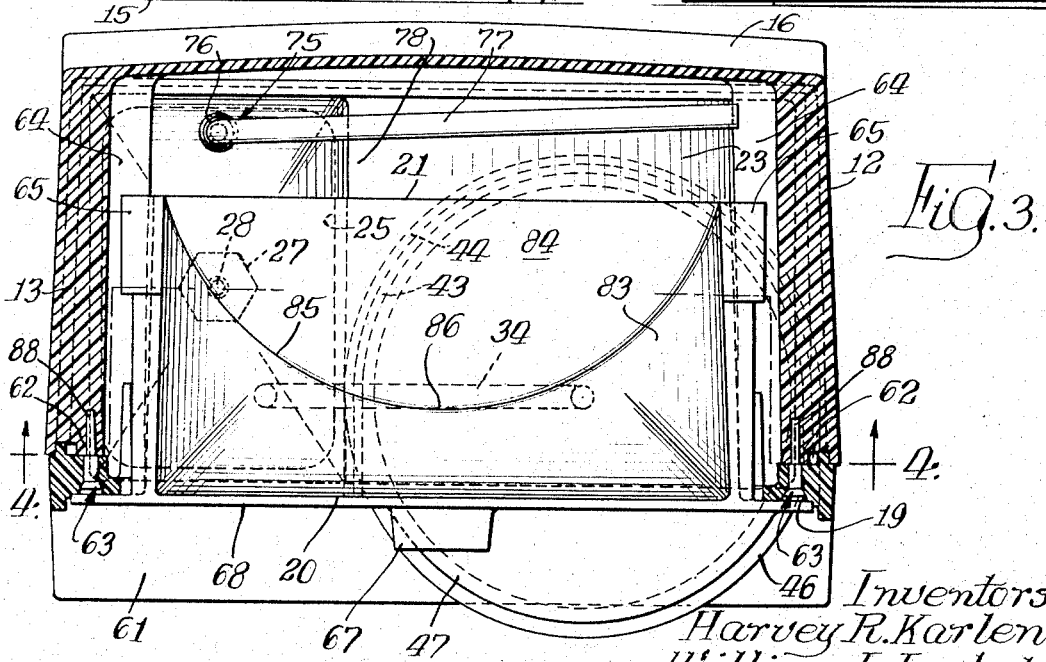
Inventors:
Harvey R. Karlen,
William L. Lockett,
By Hofgren, Wegner, Allen,
Stellman & McCord Attys.

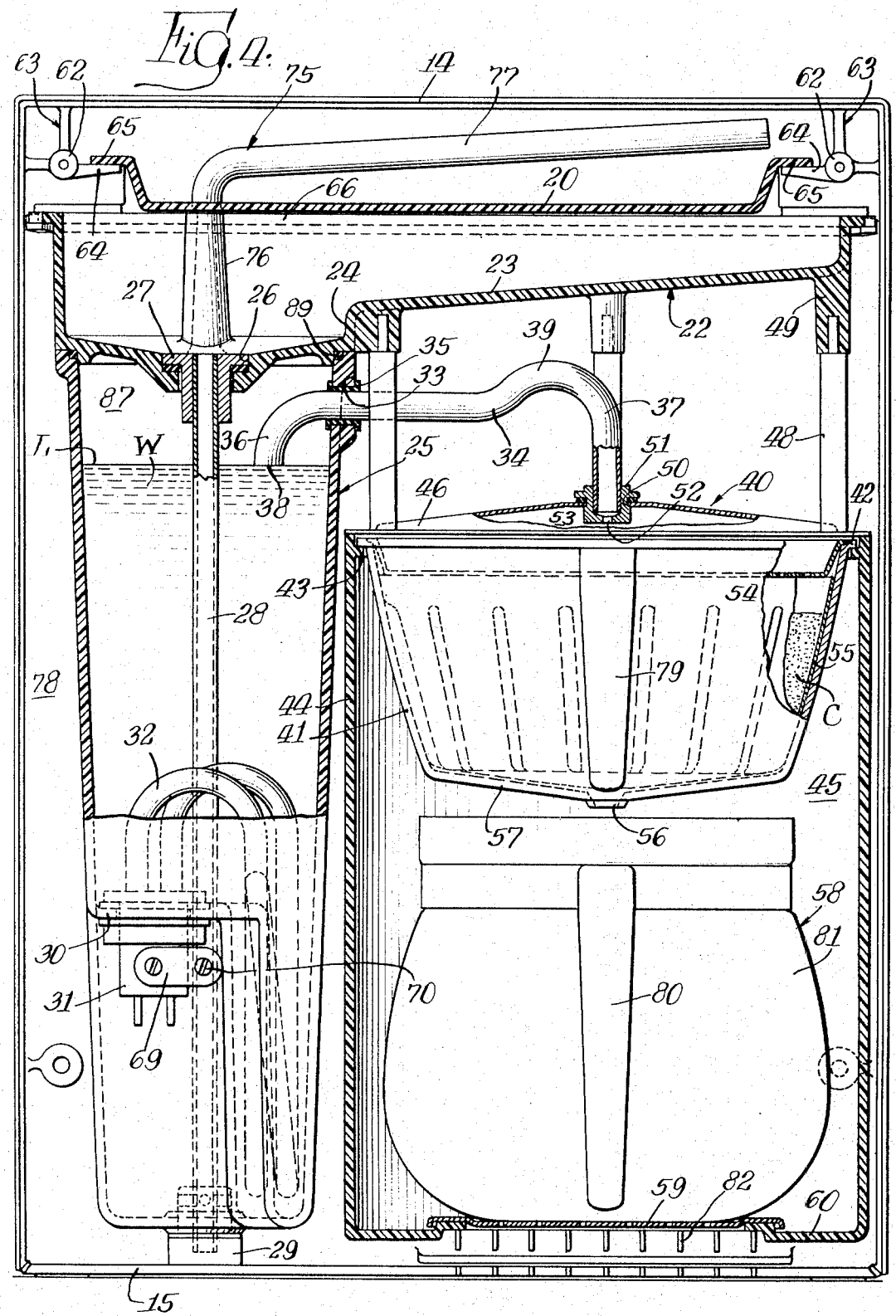

United States Patent Office 3,366,034
Patented Jan. 30, 1968

3,366,034
BREWING APPARATUS
Harvey R. Karlen, Chicago, and William L. Lockett, Downers Grove, Ill., assignors to Cory Corporation, a corporation of Delaware
Filed Oct. 21, 1965, Ser. No. 499,306
19 Claims. (Cl. 99—282)

ABSTRACT OF THE DISCLOSURE

A coffee brewer of the pour-through type having an upper basin into which cold water is poured as from a decanter and from which the cold water is delivered to a hot water tank. The delivery of cold water to the hot water tank forces previously heated hot water outwardly therefrom and through a suitable delivery conduit having a metering means associated therewith into a brewing cartridge provided with an upper spreader plate for uniformly distributing the hot water over a quantity of ground coffee in the cartridge. The hot water forms a brew in the cartridge which is delivered through a bottom opening therein to a subjacent decanter. The cold water delivery may be effected relatively quickly whereas the hot water delivery to the cartridge is maintained for a relatively long period of time preselected to provide optimum brewing.

---

This invention relates to brewing apparatus and in particular to apparatus for providing brew such as coffee.

One known method of brewing a beverage such as coffee, is to provide the beverage charge in a suitable cartridge through which hot water is passed to form the beverage infusion. In conventional automatic apparatus utilizing this method of brewing, means are provided for heating a substantial quantity of water to brewing temperature so that when a brewing operation is to be effected a selected quantity of the hot water may be withdrawn from the heating means and passed through the cartridge.

For home use, it is desirable to simplify the construction of the apparatus thereby to reduce the cost thereof while yet permitting the user to obtain an accurate preselected quantity of coffee. In one known home type brewer the cartridge is merely disposed over a suitable container and the user merely pours a preselected quantity of hot water therethrough, as from a teakettle or the like. This pour-through concept is highly desirable as it permits the user to accurately gauge the quantity of brewed coffee as this quantity is closely equal to the quantity of hot water poured through the cartridge, the quantity being decreased only by the small amount of hot water necessary to wet the grounds and retained in the cartridge upon completion of the brewing operation.

The present invention comprehends an improved brewing apparatus of the pour-through type which effectively eliminates the undesirable requirement of heating the desired quantity of water by means separate from the brewing apparatus, while yet providing all of the desirable features and advantages of the known pour-through brewers. Thus, a principal object of the present invention is the provision of a new and improved brewing apparatus.

Another object of the invention is the provision of a new and improved pour-through type of brewing apparatus.

A further object of the invention is the provision of such a brewing apparatus arranged to permit the user to pour thereinto a preselected quantity of cold water and substantially immediately initiate a pour-through brewing operation, with the quantity of brew being substantially equal to the quantity of cold water poured into the apparatus.

Still another object of the invention is the provision of such a brewing apparatus having new and improved means for delivering the cold water to a heating tank of the apparatus.

A yet further object of the invention is the provision of such a brewing apparatus having new and improved means for conducting hot water from the heating tank to the brewing cartridge.

Still another object of the invention is the provision of such a brewing apparatus arranged to permit the delivery of cold water thereto at a relatively high rate while yet conducting the pour-through brewing operation at a preselected optimum brewing rate.

A further object of the invention is the provision of such a brewing apparatus having new and improved means permitting the maintenance of the water in the heating tank at brewing temperature at all times while yet effectively minimizing evaporation of the water from the heating tank.

Another object of the invention is the provision of such a brewing apparatus which is extremely simple and economical of manufacture while yet providing improved pour-through brewing.

A further object of the invention is the provision of such a brewing apparatus including means defining a heating chamber for holding water to be heated therein, means defining an outlet from an upper portion of the heating chamber, first conducting means for conducting water to the heating chamber, means for heating water in the heating chamber, means defining a brewing chamber having an open outlet, and second conducting means for conducting hot water from the outlet through the brewing chamber for effecting a flow-through brewing operation in the brewing chamber.

Another object of the invention is the provision of such a brewing apparatus further including means defining an inlet receptacle above the level of the outlet with the first conducting means being connected to the receptacle.

Yet another object of the invention is the provision of such a brewing apparatus further including means defining a vent from the top of the heating chamber and including means for condensing water vapor for return thereof to the heating chamber.

Other objects and advantages of the invention will be apparent from the following description taken in connection with the accompanying drawings wherein:

FIGURE 1 is a front elevation of a brewing apparatus embodying the invention;

FIGURE 2 is a right side elevation thereof;

FIGURE 3 is an enlarged horizontal section taken substantially along the line 3—3 of FIGURE 1; and FIGURE 4 is a further enlarged vertical section taken substantially along the line 4—4 of FIGURE 3.

In the exemplary embodiment of the invention as disclosed in the drawing, a brewing apparatus generally designated 10 is shown to comprise a generally parallelepiped cabinet 11 having a right side wall 12, a left side wall 13, a top wall 14, a bottom wall 15, and a rear wall 16. The front of the cabinet is defined by a front side wall 17 having an opening 18 in the lower right-hand corner thereof and an opening 19 at the top thereof subjacent top wall 14.

A delivery tray 20 extends through front wall opening 19 and includes a rear edge 21 spaced forwardly substantially from the rear wall 16 of cabinet 11 when the tray 20 is in the fully inserted position of FIGURE 3. As best seen in FIGURE 4, the tray overlies a pan 22 having a downwardly sloped bottom wall 23 for conducting water falling downwardly over rear edge 21 of tray 20 to a well 24 defining the lowermost portion of the pan 22. A hot water heating tank 25 extends downwardly from wall portion 24 of the pan 22 and is provided with a central opening 26 having an inlet fitting 27 coaxially fixed therein. A delivery tube 28 extends downwardly from fitting 27 to open into a depending well 29 at the lower end of the tank 25 for delivering water into the lower portion of the tank. The tank is provided with a recessed portion 30 carrying an electrical plug-in type terminal 31 with an electrical water heating element 32 being disposed in the lower portion of the tank 25 and connected to the terminal 31.

Tank 25 is further provided with an outlet opening 33 in the upper portion of the tank closely subjacent the well 24. Hot water is delivered from tank 25 through outlet 33 through a transfer conduit 34 extending through outlet opening 33 and sealed to the tank 25 by a suitable annular gasket 35. The inner end 36 of conduit 34 is downturned to define a siphon extension which cooperates with an outer end downturned siphon portion 37 exteriorly of the tank 25 to siphon water from the tank to the back of the bottom end 38 of the siphon portion 36 as will be brought out more fully hereinafter. As shown in FIGURE 4, the transfer conduit 34 includes a gooseneck portion 39 extending to slightly above the level of outlet opening 33.

Hot water is delivered from tank 25 through conduit 34 to a brewing cartridge 40 (FIGURE 4) having an upwardly opening cup-shaped member 41 provided at its upper end with an outturned annular flange 42 slidably carried on a track 43 formed in a semi-cylindrical wall 44 defining a forwardly opening semi-cylindrical recess 45 rearwardly of front wall opening 18. The upper end of the recess 45 is defined by a circular plate 46 which as shown in FIGURE 4 rests on the wall 44. An arcuate canopy 47 extends outwardly from the wall 17 to overlie the plate 46. A plurality of posts 48 are secured to depending bosses 49 on the pan 22 for securing the plate 46 as discussed above. As best seen in FIGURE 4, plate 46 is provided with a central opening 50 in which is mounted an inlet fitting 51 receiving the lower end of the conduit outer end portion 37. Fitting 51 is provided with a relatively small metering orifice 52 for controlling the rate of flow of the hot water into the upper portion of the brewing chamber 53 within the cartridge 40. As shown in FIGURE 4, the cartridge may be further provided with a spreader plate 54 extending transversely across the chamber 53 subjacent the cover plate 46. The coffee charge C may be retained in the cartridge by means of a filter paper cup 55 subjacent the spreader cap 54. Brewed coffee is delivered from the cartridge through an outlet opening 56 in the bottom wall 57 thereof and may be received in a suitable receptacle, such as decanter 58, disposed subjacent the opening 56. The decanter may be retained on a suitable warmer plate 59 carried on a bottom wall 60 at the lower end of the cylindrical side walls 44 defining the recess 45 and heated by a suitable electrical heater 82.

As shown in FIGURE 2, front wall 17 further includes a lower forwardly projecting foot portion 61. The front wall may be secured to the remainder of cabinet 11 by means of a pair of screw receptacles 62 provided in a corner structure 63 extending along the juncture of the top wall 14 and the right side wall 12 and left side wall 13, respectively. As shown in FIGURE 4, the corner structures 63 include an inwardly turned ledge 64 on which opposed side flanges 65 of the tray 20 are slidably received for guiding the tray to the inserted position of FIGURE 3. The front wall 17 includes an upper edge portion 66 on which the tray may slide in moving to and from the inserted position of FIGURE 3, the movement of the tray being facilitated by means of a handle 67 projecting forwardly from the front wall 68 thereof.

Control of the heating element 32 may be effected by a conventional thermostat 69 having means 70 for adjusting the operating temperature thereof which illustratively may be approximately 188° F. The front wall 17 is provided with an access opening 71 through which a suitable tool such as a screwdriver may be inserted to effect adjustment of the thermostat setting. The apparatus 10 may include a conventional "On-Off" switch 72 for controlling the warmer plate 59 and a suitable "Warmer-On" light 74 for indicating the operation of the warmer. The thermostat 69 cycles heating element 32 to maintain the set temperature and a "Water Heating" light 73 may be provided to indicate when the water is being heated. Conventional suitable circuitry for interconnecting the electrical components hereof may be employed as is obvious to those skilled in the art.

Thus, the temperature of the water W in the tank 25 is effectively maintained at the selected temperature at all times. While this temperature is preferably below the boiling temperature of the water, some vaporization of the water occurs in the tank 25. As shown in FIGURES 3 and 4, the tank 25 is provided with a vent 75 having a vertically upwardly extending portion 76 leading from the rear top of the tank and a generally horizontal, slightly inclined distal portion 77 extending along the rear wall 16 of the cabinet 11 to terminate adjacent the right side wall 12. The distal portion 77 of the vent functions somewhat in the manner of a condenser tube in that the vapor vented from the tank 25 is cooled by the relatively cool walls of the tube portion 77 and caused to condense, whereupon the condensate runs back along the slightly inclined conduit and downwardly through the vent portion 76 into the body of water W in the tank. As only a small amount of heat energy is required to maintain the water W in tank 25 at the desired brewing temperature, as a result of the insulating effect of the surrounding air space 78 between the tank 25 and the walls of tank 11, the amount of vapor is relatively small and thus readily condensed by the relatively cool condensing portion 77 of the vent 75 to maintain the level of water in the tank 25 substantially constant over relatively long periods of time, such as several days.

Cartridge 40 may be provided with a suitable handle 79 for facilitated installation and removal of the cartridge as for providing a fresh charge for a subsequent brewing operation and for removing the spent charge upon completion of the brewing operation. Decanter 58 may be provided with a conventional handle 80 for facilitated dispensing of the coffee collected in the decanter bowl 81.

The operation of the pour-through brewer 10 is extremely simple. The tank 25 is firstly filled with a suitable quantity of water to raise the level therein sufficiently to cause a discharge from the tank through the transfer conduit 34. The water continues to flow outwardly through the conduit 34 after the delivery to the tank is discontinued until sufficient water is withdrawn from the tank to lower the level thereof to the level L shown in FIGURE 4 as a result of the siphoning action of the conduit 34. The apparatus is connected to a suitable source of electrical power (not shown) whereupon the water in tank 25 is heated to the desired brewing temperature under the control of the thermostat 69. As indicated above, the temperature may be adjusted to suit the particular ambient conditions in which the apparatus is utilized. During the heat-up operation, the "Water Heating" light 73 remains energized, indicating the user that the water has not as yet come up to the desired brewing temperature so that a brewing operation should not be attempted at that time. As the water is heated in the tank 25, the volume thereof increases as a result of the thermal expansion characteristics of the water. However, the conduit 34 is arranged so that no flow of the water therethrough to the outlet opening 52 occurs at the volume in the tank and conduit 34 above the level L and below the bottom of the gooseneck portion 39 is preselected to be greater than the total volume of expansion of the water in the heating process. Thus, the brewer is dripless in operation.

When it is desired to brew a quantity of coffee, the user installs the brewing cartridge 40, firstly removing the cartridge from the apparatus and placing therein a suitable filter cup 55 and quantity of ground coffee C proper for the desired quantity of coffee to be brewed. The cartridge is then reinstalled in the apparatus in the position shown in the drawing.

A preselected quantity of cold water equal to the quantity of coffee desired is then delivered to tank 25. Illustratively, the preselected quantity of water may be placed in the decanter 58. The tray is partially withdrawn from the inserted position of FIGURE 3 until the rear edge 21 thereof is disposed forwardly of the inlet 27 as shown in FIGURE 3 and the cold water is poured into the tray, as from decanter 58, to flow thereover and past rear edge 21 onto the pan 22 for delivery downwardly through fitting 26 and tube 28 to the well 29 of the tank 25. To facilitate the flow of cold water into and over the tray 20, the tray is provided with a rearwardly and downwardly inclined front apron 83 joining the flat rear portion 84 of the tray along an arcuate juncture line 85. To provide optimum facilitated flow, the cold water is preferably poured onto the tray at the portion 86 thereof adjacent the mid-point of line 85.

The cold water entering the tank at well 29 raises the level of the hot water in the upper portion of the tank until the level reaches the level of the bottom of gooseneck 39 whereupon the hot water flows outwardly through the conduit 34 and through the meter port 52 into the cartridge 40 to initiate the brewing operation. The rate of delivery of the cold water into the tank 25 is controlled by the size of the tube 28 and the rate of delivery of the hot water from the tank 25 is controlled by the size of the metering port 52 so that a sufficient period of time may elapse from the time the user begins to pour the cold water onto the tray 20 until brew commences to be delivered through the outlet 56 of the cartridge 40 to permit the user to pour the entire contents of the decanter 58 into the tray and replace the decanter subjacent the cartridge to receive the brewed coffee from the outlet 56. Herein, the space 87 in the tank above the siphoned level L is approximately 18 cubic inches in volume. Thus, approximately two cups of water may be accommodated in the space 87 during the pour-through operation. The inlet duct 28 herein comprises a duct having an inner diameter of approximately 5/16 inch and the outlet duct 34 comprises a conduit having a similar 5/16 inch inner diameter, with the metering port 52 having a diameter of approximately .140 inch to provide the desired control of the flow rate of the hot water from the tank.

The capacity of pan 22 taken together with the volume within delivery conduit 28, the space 87, the volume within transfer conduit 34, and the volume of water necessary to wet the grounds C of coffee in the cartridge 40 are preselected to permit the pouring into the apparatus of a quantity of cold water equal to the maximum number of cups of coffee which the cartridge 40 is adapted to brew, in the above indicated manner of pouring the cold water into the tray and placing the decanter 58 upon completion of the pouring operation below the cartridge to receive the brewed coffee therefrom. The metering orifice 52 is further suitably sized to cause the rate of delivery of hot water to the cartridge to brew the maximum number of cups of coffee within a preselected maximum time such as 180 seconds. As the tray 20 is relatively wide, the cold water may be delivered quite rapidly thereto so that the time of delivery of the cold water to the apparatus may be relatively short irrespective of the total quantity. Thus, the user may readily complete the pouring of the cold water into the apparatus, for any of the different quantities of brew desired, and place the decanter below the cartridge outlet 56 in ample time to receive the first quantity of brewed coffee therefrom.

As indicated above, once the flow of water from tank 25 commences the flow continues until the level drops back to the level L at the lower end 38 of the outlet conduit portion 36. Thus, the expansion space is automatically restored upon completion of each brewing operation, maintaining the apparatus drip-proof at all times.

The apparatus may be readily serviced. As discussed above, the cartridge 40 may be readily removed and installed by simple sliding movement of the flange portion 42 on the track 43 of the cabinet portion 44. Further, the front wall may be readily removed by removing the screws 88. Still further, the pan 22 may be readily removed through the front of the cabinet after the front wall 17 is removed. As shown in FIGURE 4, the wall portion 24 defines the cover of the tank 25 and is sealingly secured thereto by a suitable gasket 89. As shown in FIGURE 4, the tank may be formed of a suitable plastic material such as polyester fiber plastic. The cabinet 11 may be similarly formed of suitable plastic material thereby further simplifying the construction and reducing the cost of the apparatus 10. The simplicity of the construction assures long trouble-free life with effectively minimum maintenance requirements. The use of the apparatus, as discussed above, is extremely simple while yet assuring effectively optimum brewing of the coffee with effectively minimum brewing procedures.

While we have shown and described one embodiment of our invention, it is to be understood that it is capable of many modifications. Changes, therefore, in the construction and arrangement may be made without departing from the spirit and scope of the invention as defined in the appended claims.

We claim:

1. In a brewing apparatus having a tank, means for heating water in the tank, a brewing device, and conduit means for delivering hot water from the top of the tank to the brewing device as a result of delivery of cold water into the tank, a housing adjacent the top of the tank having an opening, and means for directing cold water into said tank including a portion in said housing selectively movable through said opening to have water poured thereon conducted therefrom to said tank.

2. The brewing apparatus of claim 1 wherein said directing means is arranged to limit the rate of flow of cold water to said tank to a preselected maximum for providing at least a preselected minimum brewing time.

3. The brewing apparatus of claim 1 wherein said conduit means includes a metering portion for limiting the rate of flow to said brewing device to a preselected maximum for providing at least a preselected minimum brewing time.

4. The brewing apparatus of claim 3 wherein said conduit means includes means for siphoning a portion of the water from said tank at the conclusion of a brewing operation thereby to provide an expansion space in said tank precluding overflow therefrom to said brewing device as the result of expansion of the cold water in the tank when heated by said heating means.

5. The brewing apparatus of claim 1 wherein said directing means portion is arranged to receive a quantity of water substantially equal to the quantity of brew desired, said directing means being arranged to conduct the water at a controlled rate for providing at least a preselected minimum brewing time irrespective of the rate of delivery of water to said directing means portion.

6. The brewing apparatus of claim 1 wherein said directing means portion comprises a shallow tray.

7. The brewing apparatus of claim 6 wherein said tray is provided with an edge over which water may flow to fall downwardly from the tray, and said directing means further includes means below said tray for receiving water falling therefrom and conducting it into said tank.

8. The brewing apparatus of claim 1 wherein said directing means includes:
  means for closing the top of said tank defining a pan extending to substantially laterally of said top and having conduit means defining an inlet to said tank extending to adjacent the bottom of said tank, said pan being arranged to guide water poured thereon to said inlet conduit for delivery therethrough into said tank adjacent said bottom.

9. The brewing apparatus of claim 8 wherein said tank and pan are formed of plastic.

10. The brewing apparatus of claim 8 wherein said pan further carries means for venting the tank.

11. The brewing apparatus of claim 1 wherein said directing means portion includes a front wall normally closing said housing opening.

12. The brewing apparatus of claim 1 wherein said directing means portion includes a front wall normally closing said housing opening and provided with a handle for moving said portion relative to said housing.

13. The brewing apparatus of claim 1 wherein said housing includes an upright wall and said opening is disposed in said upright wall to open horizontally.

14. The brewing apparatus of claim 1 wherein said directing means portion is slidably carried in said housing.

15. The brewing apparatus of claim 1 wherein said directing means further defines means for closing the top of said tank.

16. In a brewing apparatus having a tank, means for heating water in the tank, a brewing device defining a brewing chamber having an upper opening, and conduit means for delivering hot water from the top of the tank through said opening in the brewing device as a result of delivery of cold water into the tank, and basin means for receiving a quantity of cold water poured thereinto and directing said quantity by gravity flow into said tank thereby to displace from the tank through said conduit means a corresponding quantity of hot water, flow control means comprising:
  a foraminous spreader plate across said opening of the brewing chamber;
  means upstanding about the periphery of said spreader plate defining a space overlying the spreader plate for receiving the hot water from said conduit means; and
  means associated with said conduit means and spaced from said spreader plate for metering the rate of flow of the hot water to said space whereby cold water may be poured into said basin in a relatively short period of time whereas the resultant delivery of hot water to said space extends over a relatively long period of time.

17. The brewing apparatus of claim 16 wherein said upstanding means is formed integral with said spreader plate.

18. The brewing apparatus of claim 16 wherein said conduit means has an inlet at a preselected level within said tank and an outlet end exteriorly of said tank below said level and said metering means is carried by said outlet end.

19. The brewing apparatus of claim 16 wherein the rate of flow through said spreader plate and brewing device is limited by the metering orifice to assure that the entirety of said quantity of hot water is directed through said brewing chamber.

References Cited

UNITED STATES PATENTS

| | | | |
|---|---|---|---|
| Re. 21,393 | 3/1940 | Losee | 219—314 |
| Re. 25,663 | 10/1964 | Bunn | 99—282 |
| 2,456,698 | 12/1948 | Hall | 219—314 |
| 2,568,474 | 9/1951 | Van Sciver | 219—314 |
| 2,782,706 | 2/1957 | Colonna | 99—315 |
| 3,034,418 | 5/1962 | Bunn | 99—323 |
| 3,220,334 | 11/1965 | Martin | 99—282 |
| 3,291,033 | 12/1966 | Curtis et al. | 99—283 |

ROBERT W. JENKINS, *Primary Examiner.*